United States Patent Office 3,660,486
Patented May 2, 1972

---

3,660,486
DIPHENYL AMINE UREA DERIVATIVES
Kurt Thiele, Frankfurt am Main, Germany, assignor to Deutsche Gold- und Silber-Scheideanstalt vormals Roessler, Frankfurt am Main, Germany
No Drawing. Continuation-in-part of application Ser. No. 656,073, July 26, 1967. This application Dec. 15, 1969, Ser. No. 885,311
Int. Cl. C07c 127/00
U.S. Cl. 260—553 A
6 Claims

ABSTRACT OF THE DISCLOSURE

Diphenyl amine derivatives of the formula

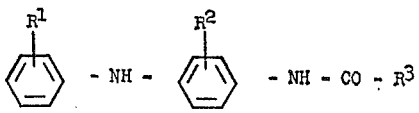

wherein each of $R^1$ and $R^2$ can be hydrogen, halogen, hydroxy, lower alkyl or lower alkoxy and $R^3$ is lower alkyl or alkenyl of up to 6 carbon atoms; pyridyl; phenyl or pyridyl substituted with halogen, hydroxy, amino, lower alkoxy or lower alkyl; lower alkoxy with 1 to 6 carbon atoms; mono and dialkyl amino groups wherein alkyl is of 1 to 6 carbon atoms in which the alkyl groups can be closed, if desired, with another heteroatom to a 5, 6 or 7 membered ring as in pyrrolidone, piperidine morpholine, piperazine and homopiperazine and any primary amino groups present can, if desired, be acylated with low molecular weight organic acids such as the alkanoic acids or derivatives of carbonic acid and their acid addition salts. The compounds have good anti-inflammatory, analgesic and anti-pyretic action.

---

This application is a continuation-in-part of application Ser. No. 656,073, filed July 26, 1967, and now abandoned.

SUMMARY OF THE INVENTION

The invention relates to novel diphenyl amine derivatives having anti-inflammatory, analgesic and anti-pyretic action which are of the formula

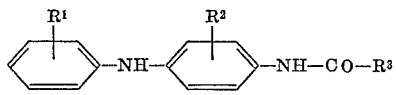

I wherein each of $R^1$ and $R^2$ can be hydrogen, halogen, hydroxy, lower alkyl or lower alkoxy and $R^3$ is lower alkyl or alkenyl of up to 6 carbon atoms; pyridyl; phenyl or pyridyl substituted with halogen, hydroxy, amino, lower alkoxy or lower alkyl; lower alkoxy with 1 to 6 carbon atoms; mono and dialkyl amino groups wherein alkyl is of 1 to 6 carbon atoms in which the alkyl groups can be closed, if desired, with another heteroatom to a 5, 6 or 7 membered ring as in pyrrolidone, piperidine, morpholine, piperazine and homopiperazine and any primary amino groups present can, if desired, be acylated with lower molecular weight organic acids such as the alkanoic acids of derivatives of carbonic acid and their acid addition salts.

DETAILED DESCRIPTION OF THE INVENTION INCLUDING PREFERRED EMBODIMENTS

The comounds according to the invention can, for example, be produced as follows:
(1) Reacting a compound of the formula

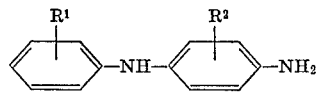

II (a) With a compound of the formula $$R^3COOH \quad \quad III$$

or a derivative thereof such as derived by alteration of the carboxyl group, such as, the acid halides, acid anhydrides, esters or ketenes (b) With potassium cyanate or an isocyante of the formula $$O=C=N-R^4 \quad \quad IV$$

wherein $R^4$ is lower alkyl with 1-6 carbon atoms (c) With a carbonic acid derivative, such as, phosgene or chloroformic acid ethyl ester, and ammonia or an amine of the formula

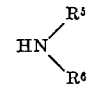

V wherein $R^5$ and $R^6$ are lower alkyl with 1-6 carbon atoms which may also, if desired, be closed to a 5, 6 or 7 membered ring which may also include a further heteroatom and $R^5$ in addition can be hydrogen, such reaction between the reaction components being simultaneous or sequentially (d) With a compound of the formula $$R^7NH—CO—R^3 \quad \quad VI$$

wherein $R^7$ can be hydrogen, acyl, preferably, acetyl, or a nitro group.

(2) Reacting a compound of the formula

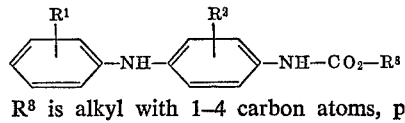

wherein $R^8$ is alkyl with 1-4 carbon atoms, phenyl or benzyl, with an amine of the Formula V.

(3) Reducing the nitro group or groups contained in a compound of the formula

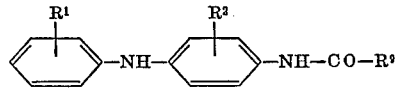

wherein $R^9$ is phenyl or pyridyl having at least one nitro group as substituent, which phenyl or pyridyl may also in addition be substituted with halogen, hydroxy, lower alkoxy and/or lower alkyl, to an amino group or amino groups.

If desired, when any of the products produced by methods 1, 2 and 3 having a primary amino group present therein it can be acylated with a derivative of a lower aliphatic acid or of carbonic acid.

The compounds also can be converted to their pharmacologically acceptable salts in a known manner, such as, for example, the acid addition salts with hydrochloric, sulfuric, phosphoric, acetic, succinic, maleic, fumaric, citric, lactic and similar pharmaceutically acceptable acids normally employed in the production of pharmacologically acceptable salts.

The products insofar as they may be racemates can be resolved into their optically active compounds by known methods. Also optically active starting materials can be employed.

In procedure (1)(a), the acid derivatives coming into consideration, for example, are the halides, esters, anhydrides, amides or ketenes. The reaction can be effected with or without solvents at temperatures between 0 and 300° C. When the free acids are employed the temperatures used are mostly over 100° C. Suitable solvents, for instance, are alcohols, aromatic hydrocarbons, dioxane, tetrahydrofurane, aliphatic ethers, dimethyl-sulfoxide, aliphatic ketones, N-methyl-pyrrolidone, sulfolane and the like. In some instances it can be of advantage to add basic substances such as alkali metal or alkaline earth metal hydroxides, alcoholates or carbonates or tertiary amines, such as, pyridine. However, when ketenes, esters or the free acids are employed basic agents are not required.

The other procedures also can be carried out with or without solvents. In procedures (1)(b) and (1)(c) solvents such as mentioned for (1)(a) are essentially suited with the exception of pyridine and alcohols for procedure (1)(c). Additionally, water comes into consideration for procedure (1)(b). In case solvents are employed for procedures (1)(d) and (2), inert solvents, such as, benzene, toluene and α-methyl-naphthalene primarily come into question.

Expediently procedure (1)(b) is carried out at a temperature within the range of 10–100° C. and procedures (1)(c) and (1)(d) within the range of 20–250° C.

The reduction of the nitro group or groups can, for example, be carried out with hydrogen in the presence of hydrogenation catalysts, such as, Raney nickel, noble metals with or without carrier, copper, brass, copper-nickel, chromite catalysts and the like or with nascent hydrogen, such as, for example, with Zn/HCl, Sn/HCl, Fe/HCl or by electrolytic reduction, or with salts of hydrogen sulfide or with activated aluminum or with $ZnCl_2$/HCl in the solvents and at the temperatures normally employed.

The subsequent acylation of the amino group or groups can be carried out using the usual methods, such as, for example, with acid halides, anhydrides or also esters. The corresponding carbamic acid derivatives and monoalkyl esters primarily come into consideration as the derivative of carbonic acid.

The compounds according to the invention possess good analgesic, anti-inflammatory and anti-pyretic activities.

The compounds, for example, have strong analgesic action in the mouse tail test according to Haffner (Deutsche Med. Wochenschrift 55, 731, 1929) at oral dosages between 1–500 mg./kg. Similar analgesic effects are provided by phenacetin at oral dosages of 700 mg./kg. The compounds generally are well tolerated at the dosage levels indicated.

The anti-inflammatory action is, for instance, shown on the inflammation models of the rat paw (method of Domenjoz and Coll., Arch. exp. Pharm. Path. 230, 325, 1957). The compounds according to the invention, for example, have strong anti-inflammatory action on carrageen edema and albumen edema of the rat paw at oral dosages of 1–300 mg./kg.

The anti-pyretic action was investigated on yeast fever of the rat (O. Büch, Arch. intern. Pharmacodyn, 123, 140, 1959). In this instance also the compounds exhibited good activity at oral dosages of 1–300 mg./kg.

The compounds according to the invention, as already indicated, are well tolerated. For instance, their acute toxicity when tested on mice, expressed as $LD_{50}$ in mg./kg. oral, is between 700 and 4000 mg./kg.

The following examples will serve to illustrate the invention. For simplicity's sake the radical

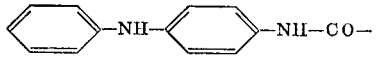

will be designated as Z in the structural formula given in such examples.

EXAMPLE 1

4-carbethoxy amino-diphenyl amine·HCl

10.3 ml. (0.1 mol) of chloroformic acid ethyl ester were gradually added to a solution of 18.4 g. (0.1 mol) of 4-amino-diphenyl amine and 14 ml. of triethyl amine in 200 ml. of benzene at 20° C. and subsequently the mixture was heated to 50° C. for about 20 minutes. The resulting precipitate was filtered off and the benzene solution shaken out once with water. After separation and drying over sodium sulfate the benzene solution was concentrated and the resulting residue dissolved in alcohol. After addition of isopropanolic HCl and ether the hydrochloride salt soon crystallized out and after recrystallization from alcohol ether it had a melting point of 156–157° C. The yield was 10 g. or about 34% of theory.

EXAMPLE 2

4-propionylamino-diphenyl amine

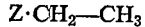

14.9 g. (0.11 mol) of propionic acid anhydride were added to a solution of 18.4 g. (0.1 mol) of 4-amino-diphenyl amine in 100 ml. of acetone. The mixture was boiled for about 15 minutes under reflux and then after 2 hours' standing water was added. The precipitated product was recrystallized twice from alcohol. Its melting point was 120–121° C., the yield 12.5 or 25% of theory.

EXAMPLE 3

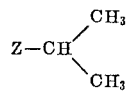

15.8 g. (0.1 mol) of isobutyric acid anhydride were added to a solution of 18.4 g. (0.1 mol) of 4-amino-diphenyl amine in 100 ml. of dioxane. The reaction mixture was heated to 60° C. for 30 minutes. After cooling down, petroleum ether was added to the solution until just before lasting clouding occurred. After several hours' standing the resulting crystallized product was filtered off and recrystallized twice from isopropanol/petroleum ether. Its melting point was 147–148° C., the yield 13 g.

EXAMPLE 4

4-pivaloylamino-diphenyl amine

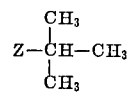

18 g. (0.15 mol) of pivalic acid chloride were added gradually to a solution of 27.6 g. (0.15 mol) of 4-amino-diphenyl amine and 15 ml. of pyridine in 100 ml. of acetone. After the reaction ended, water was added to the solution and it was shaken out with chloroform. The organic phase was separated off, dried and concentrated. The residue was recrystallized from methyl ethyl ketone/petroleum ether and twice from toluene. The product had a melting point of 138° C. and the yield was 24 g.

EXAMPLE 5

4-(4-aminobenzamino)-diphenyl amine

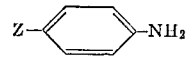

63 g. of 4-(4-nitro-benzamino)-diphenyl amine were dissolved in 1 liter of methanol and hydrogenated in the presence of 10 g. of Raney nickel at 60° C. The compound produced was recrystallized from isopropanol. Its melting point was 166° C., the yield 30 g.

Acylation with chloroformic acid ethyl ester in the presence of pyridine in acetone at 25–30° C. produced the 4 - (4 - carbethoxyaminobenzamino)-diphenyl amine. Its melting point was 214° C., the yield 60%.

EXAMPLE 6

(a) 4-(4-chloro-benzamino)-diphenyl amine

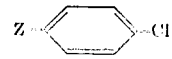

0.2 mol of p-chlorobenzoyl chloride was added gradually to a solution of 0.2 mol of 4-aminodiphenyl amine and 20 ml. of pyridine in acetone. After the reaction ended a considerable quantity of water was added so that the reaction product precipitated. It was filtered off and recrystallized from dimethyl formamide/isopropanol. Its melting point was 212° C., the yield 85% of theory.

(b) 4-(methoxy-benzamino)-diphenyl amine

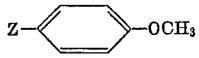

was prepared analogously using p-methoxy benzoyl chloride. Its melting point was 176° C. and the yield 71% of theory.

(c) 4-(nicotinoylamino)-diphenyl amine

was prepared analogously using nicotinic acid anhydride. The crude product was recrystallized from methanol. Its melting point was 185–186° C., the yield 54% of theory.

EXAMPLE 7

(a) N-(4-phenylamino-phenyl)-N'-methyl-urea

4.9 ml. of methyl isocyanate were gradually added while stirring to a solution of 15 g. (0.815 mol) of 4-aminodiphenyl amine in 100 ml. of ether. The reaction product soon began to crystallize from the solution. The reaction mixture was stirred for a further 30 minutes after the precipitation began. The precipitated product was filtered off and recrystallized from dimethyl formamide/water. Its melting point was 189–190° C., the yield 13 g. or 44% of theory.

(b) Analogously N-(4-phenyl-amino-phenyl)-N'-ethyl-urea

was prepared from ethyl isocyanate. Its melting point was 185–186° C., the yield about 70% of theory.

EXAMPLE 8

(a) N-(4-phenyl-amino-phenyl)-N',N'-di-isopropyl-urea

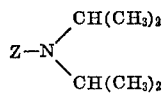

1 mol of 4-carbophenoxyamino-diphenyl amine was dissolved in toluene and boiled under reflux for 15 minutes with 2 mole of di-isopropylamine. After cooling down the toluene solution was shaken out with dilute aqueous NaOH. The product which was obtained upon concentration of the toluene solution was well triturated with water, filtered off and recrystallized from methyl ethyl ketone. Its melting point was 155° C., the yield 69% of theory.

(b) Pyrrolidino-carboxylic acid-(4-phenylamino-anilide)

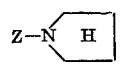

was prepared analogously using pyrrolidine. Its melting point was 144° C., the yield 67% of theory.

(c) Morpholine carboxylic acid-(4-phenylamino-anilide)

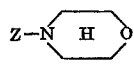

was prepared analogously using morpholine. Its melting point was 182–183° C., the yield about 46% of theory.

EXAMPLE 9

3-methoxy-4-propionylamino-diphenyl amine

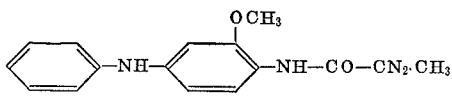

6.1 ml. (0.0466 mol.) of propionic acid anhydride were added to a solution of freshly distilled 3-methoxy-4-amino-diphenyl amine in 50 ml. of dioxane. The reaction mixture was heated to boiling for about 5 minutes. After the solution had cooled somewhat water was added until clouding occurred. Upon rubbing with a glass rod the product crystallized out. It was filtered off, washed several times with hot water and recrystallized from isopropanol/water. Its melting point was 114–115° C., the yield 11 g. or about 85% of theory.

EXAMPLE 10

(a) N-(4-phenylamino-2-methoxy-phenyl)-N'-methyl urea

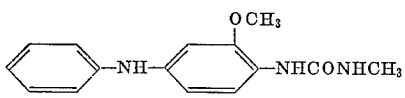

2.76 g. of methyl isocyanate were added to a solution of 3-methoxy-4-amino-diphenyl amine in 150 ml. of ether. The reaction mixture was allowed to stand overnight at room temperature. The precipitated crystalline product was filtered off and recrystallized from alcohol/water. Its melting point was 154–155° C., the yield 9.5 g. or about 75% of theory.

(b) N - (4 - phenylamino-2-methoxy-phenyl)-N'-ethyl urea was prepared analogously using ethyl isocyanate. Its melting point was 147–148° C., the yield about 60% of theory.

EXAMPLE 11

4-acryloylamino-diphenyl amine

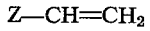

18 g. of 4-amino-diphenyl amine in 80 ml. of acetone were reacted with 10 ml. of pyridine and 7.9 ml. of acrylic acid chloride. The reaction mixture was stirred with water whereupon the amide crystallized out. It was recrystallized twice from isopropanol/gasoline. Its melting point was 154° C. and the yield 9 g.

EXAMPLE 12

4-acetamino-4'-methyl diphenylamine

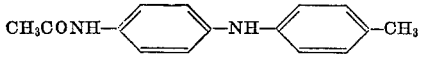

To a solution of 4 grams (0.02 mole) of 4-amino-4'-methyl diphenyl amine in 30 ml. benzene there were added 2.06 grams (0.02 mole) of acetic anhydride. The temperature rose to 40° C. and the solution after a short time solidified to a gel. Through the addition of 50 ml. of isopropanol and heating to boiling there was obtained a solution. After addition of petroleum ether 4-acetamino-4'-methyl diphenyl amine crystallized out. It was recrystallized from isopropanol-benzine. Its melting point was 145–146° C., the yield was 3.7 grams (77% of theory).

EXAMPLE 13

4-acetamino-4'-methoxy diphenylamine

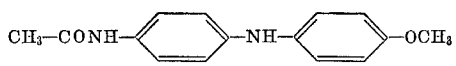

The compound was prepared in an analogous manner to that of Example 12 but using 0.02 mole of 4-amino-4'-methoxy diphenyl amine as the starting material. Yield 60% of theory, melting point 134–135° C.

EXAMPLE 14

4-propionylamino-4'-methyl diphenylamine

4-propionylamino-4'-methyl diphenyl amine was produced in a manner analogous to that of Example 12 by reacting propionic anhydride with 4-amino-4'-methyl diphenyl amine in benzene solution. The 4-propionylamino-4'-methyl diphenylamine crystallized out and was recrystallized from isopropanol-benzene, yield about 72% of theory, M.P. 146–147° C.

EXAMPLE 15

4-propionylamino-4'-methoxy diphenylamine

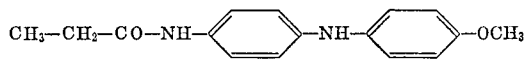

This compound was prepared in a manner analogous to Example 14 from 4-amino-4'-methoxy diphenyl amine and propionic anhydride in benzene. The compound melted at 138–139° C.

EXAMPLE 16

4-(p-toluidino)-N-morpholino carboxylic acid anilide

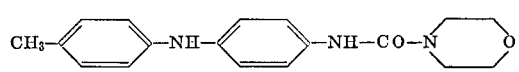

To a solution of 5 grams (0.025 mole) or 4-amino-4'-methyl diphenylamine and 2 grams (0.025 mole) of pyridine in 50 ml. of acetone were added dropwise 4 grams (0.025 mole) of chloroformic acid phenyl ester (phenyl chloroformate) with stirring at 20–25° C. At the end of the reaction the reaction mixture was diluted with water to turbidity, whereby after a short time 4-(p-toluidino)-phenoxy-carbonyl anilide crystallized out. The yield of crude product amounted to 5 grams.

Thus obtained substance was dissolved with 3 grams of morpholine in 30 ml. of isopropanol. After heating for 3 hours under reflux the solution was cooled and diluted with benzine. The 4-(p-toluidino)-N-morpholino carboxylic acid anilide which crystallized out was removed by suction, triturated with 10% aqueous soda lye, suction filtered, washed well with water and recrystallized from isopropanol-benzine, M.P. 212–213° C.

EXAMPLE 17

4-(p-anisidino)-N-morpholino carboxylic acid anilide

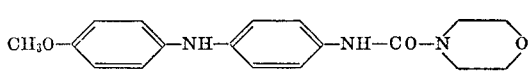

This compound was prepared in an analogous manner to Example 16 by reaction of 4-amino-4'-methoxy-diphenylamine with chloroformic acid phenyl ester in the presence of pyridine and reaction of the intermediate product obtained with morpholine in isopropanol. The substance melted at 146–147° C.

EXAMPLE 18

4-(p-toluidino)-carbethoxyanilide

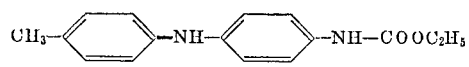

To a solution of 19.8 grams (0.1 mole) of 4-(p-toluidino)-aniline and 8 ml. of pyridine in 150 ml. of acetone there were added dropwise with stirring 10.8 grams (0.1 mole) of ethyl chloroformate. The reaction mixture was heated at 50° C. for 30 minutes. After addition of about 300 ml. of water an oil separated which soon became solid. The crystal mass was filtered off with vacuum, washed with water, dried and recrystallized from isopropanol-petroleum ether. The yield was 18.5 grams (about 68% of theory), M.P. 110–111° C.

EXAMPLE 19

4-(p-anisidino)-carbethoxyanilide

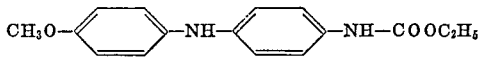

4-(p-anisidino)-carbethoxyanilide was produced in a manner analogous to Example 18 using 4-amino-4'-methoxy diphenylamine as the starting material. The yield, after twice recrystallizing from isopropanol-petroleum ether, amounted to about 50%, M.P. 91–92° C.

EXAMPLE 20

4-(p-toluidino)-β,β-dimethylacrylyl anilide

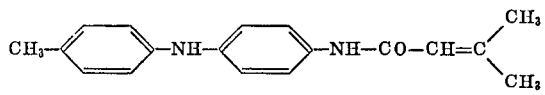

To a solution of 19.8 grams (0.1 mole) of 4-(p-toluidino)-aniline and 8 ml. of pyridine in 150 ml. of acetone there were added dropwise at 20° C. with stirring 11.8 grams (0.1 mole) of β,β-dimethylacrylic acid chloride. The reaction mixture was heated at 50° C. for 30 minutes and then poured into about 1 liter of water. The oily precipitating reaction product crystallized after a short time. It was filtered off with vacuum, washed with water several times, dried and twice recrystallized from isopropanol-gasoline. The yield was 11 grams, M.P. 126–127° C.

EXAMPLE 21

4-(β,β-dimethylacrylylamino)-diphenylamine

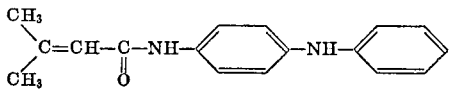

18.4 grams (0.1 mole) of p-amino diphenylamine dissolved in 100 ml. of acetone and 8 ml. of pyridine were reacted with 11.8 grams (0.1 mole) of β,β-dimethylacrylic acid chloride. After one hour the reaction mixture was treated with 200 ml. of water, rendered alkaline with soda lye and taken up in chloroform. The solvent was vaporized and the residue crystallized with isopropanol. Subsequently it was recrystallized from isopropanol-petroleum ether. The yield amounted to 45%, M.P. 113–114° C.

EXAMPLE 22

4-capronylamino diphenylamine

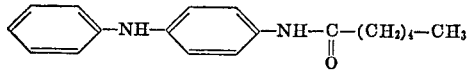

The procedure of Example 4 was followed but using capronic acid anhydride rather than pivalic acid chloride. The oil obtained was crystallized with ether and recrystallized from methyl ethyl ketone-benzine, M.P. 108° C.

EXAMPLE 23

4-(morpholinocarbamino)-diphenyl amine

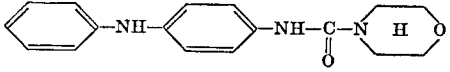

To a solution of 18.4 grams (0.1 mole) of p-amino diphenylamine and 8 ml. of pyridine in 200 ml. of methyl ethyl ketone there were added dropwise with stirring at 10–13° C. 15.7 grams (0.1 mole) of ethyl chloroformate, then 26 ml. (0.3 mole) of morpholine were added and the mixture held under reflux for 30 minutes. After cooling it was treated with 300 ml. of water whereby the organic layer separated. The solvent was drawn off and the residue recrystallized twice from methyl ethyl ketone-benzine, M.P. 182–184° C. This compound is the same as that prepared in Example 8(c).

The compounds of the invention were tested for antiphlogistic action on the carrageen edema of the rat paw using the method of Domenjoz set forth supra. The antiphlogistic action is given in the edema inhibition in percent in comparison to the untreated controls. The compounds were applied orally. The dosage was always 30 mg./kg.

The antipyretic action was tested by the method of Büch cited supra. The dosage in mg./kg. of body weight was determined at which 50% of the starting animals developed a clear antipyretic action (ED 50). The substances were applied orally.

A determination of the oral toxicity in white mice took place in the international procedure of Miller and Tainter (Arneimittelforschung 13, 711 to 716 (1963)) after an observation time of 24 hours. For this test about 80 animals were employed for each substance.

The results of the tests are found in the following table.

TABLE 1

| Example substance | Carrageen edema inhibition in percent 30 mg./kg. body weight, oral | Yeast fever test action in percent at 100 mg./kg. orally | Toxicity LD 50, mg./kg. |
|---|---|---|---|
| 2 | 60 | 127 | 1,610 |
| 4 | 51 | 68 | >4,000 |
| 6(c) | 16 | 40 | >4,000 |
| 7(a) | 37 | 104 | >4,000 |
| 7(b) | 43 | 88 | >4,000 |
| 8(b) | 64 | 100 | >4,000 |
| 8(c) | 16 | 104 | >4,000 |
| 10(a) | 47 | 118 | >4,000 |
| 10(b) | 22 | 86 | 1,600 |
| 11 | 36 | 40 | 4,000 |
| 12 | 40 | 155 | 2,060 |
| 14 | 38 | 144 | 1,130 |
| 15 | 50 | Not tested | 1,130 |
| 18 | 30 | ___do___ | 3,200 |
| 21 | 50 | ___do___ | 3,200 |
| 22 | 28 | ___do___ | 4,000 |
| Phenyl butazone | 56 | 70 | 625 |

The compounds of the invention for the most part are better than or equal in pharmacological action to the comparison phenyl butazone. Most of them are better or about equal in antiphlogistic action. Because of their relatively small toxicity, they reflect a considerably better compatibility.

Furthermore the majority of the compounds of the invention show a stronger antipyretic action than phenylbutazone independent of toxicity.

What is claimed is:

1. A compound having the formula

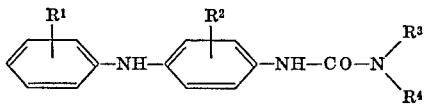

wherein $R^1$ is hydrogen or lower alkyl, $R^2$ is lower alkoxy, $R^3$ is hydrogen or lower alkyl and $R^4$ is lower alkyl; said lower alkyl and lower alkoxy having up to 6 carbon atoms and their salts with pharmaceutically acceptable acids.

2. A compound according to claim 1 where $R^2$ is in the 2 position and $R^1$ is in the 4 position.

3. A compound according to claim 2 where $R^1$ is hydrogen, $R^2$ is lower alkoxy, $R^3$ is hydrogen and $R^4$ is lower alkyl.

4. A compound according to claim 3 where $R^2$ is methoxy.

5. A compound according to claim 4 where $R^4$ is methyl.

6. A compound according to claim 4 where $R^4$ is ethyl.

References Cited

UNITED STATES PATENTS 3,138,571   6/1964   Popoff _____ 260—553 X

FOREIGN PATENTS 506,565   5/1939   Great Britain _____ 260—553
930,918   7/1963   Great Britain _____ 260—553

LEON ZITVER, Primary Examiner

M. W. GLYNN, Assistant Examiner

U.S. Cl. X.R.

260—247.2, 294 A, 295 AM, 295.5 D, 326.3, 471 R, 561 A, 501.17, 999, 326.8